(12) United States Patent
Chen et al.

(10) Patent No.: US 7,600,298 B2
(45) Date of Patent: Oct. 13, 2009

(54) HINGE ROTATIVE ON TWO MUTUAL ORTHOGONAL AXES

(75) Inventors: Chia-Hui Chen, Taoyuan (TW); Tien-Yueh Hsu, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 537 days.

(21) Appl. No.: 11/620,903

(22) Filed: Jan. 8, 2007

(65) Prior Publication Data

US 2007/0163082 A1  Jul. 19, 2007

(30) Foreign Application Priority Data

Jan. 19, 2006   (TW) ............................... 95201210 U

(51) Int. Cl.
    *E05D 3/10* (2006.01)
(52) U.S. Cl. .......................................... 16/367; 16/342
(58) Field of Classification Search ................... 16/367, 16/342, 330, 303, 334, 337, 338; 361/679.07; 455/575.1, 575.3, 550.1; 379/433.12, 433.13; 248/291.1, 291.2, 291.3, 219.4, 919–923
See application file for complete search history.

(56) References Cited

U.S. PATENT DOCUMENTS

| | | | | |
|---|---|---|---|---|
| 5,943,738 A | * | 8/1999 | Karfiol | 16/342 |
| 6,256,837 B1 | * | 7/2001 | Lan et al. | 16/334 |
| 6,845,546 B1 | * | 1/2005 | Lu et al. | 16/367 |
| 2005/0005399 A1 | * | 1/2005 | Lu et al. | 16/367 |
| 2005/0251965 A1 | * | 11/2005 | Lu et al. | 16/367 |
| 2006/0218750 A1 | * | 10/2006 | Tajima | 16/367 |
| 2007/0163082 A1 | * | 7/2007 | Chen et al. | 16/367 |
| 2007/0169316 A1 | * | 7/2007 | Lu et al. | 16/367 |
| 2008/0034546 A1 | * | 2/2008 | Hsu | 16/367 |
| 2008/0078060 A1 | * | 4/2008 | Chen | 16/367 |
| 2008/0078061 A1 | * | 4/2008 | Hsu et al. | 16/367 |
| 2008/0098568 A1 | * | 5/2008 | Hsu | 16/367 |

* cited by examiner

Primary Examiner—Chuck Y. Mah
(74) Attorney, Agent, or Firm—Ming Chow; Sinorica, LLC

(57) ABSTRACT

A hinge rotative on two mutual orthogonal axes, it is used in electronic equipment having a screen and a main body; the hinge has a fixing plate having thereon a rotation seat rotative on a vertical axis relatively to the fixing plate and has two connecting legs rotative on a horizontal axis. A nut above the rotation seat is used to screw lock to a rotation shaft, thereby twisting force on the rotation seat can be adjusted; and the connecting legs each has a resilient sleeve forming thereon a plane or forming on its lateral side a strip protruding inwards, by cooperation of the planes/strips with surfaces/recesses on shafts of the connecting legs extending into the resilient sleeves, better positioning effects are obtained; and a connecting area between the rotation shaft and the fixing plate is given with four protrusions, hence the hinge gets a stable structure.

8 Claims, 6 Drawing Sheets

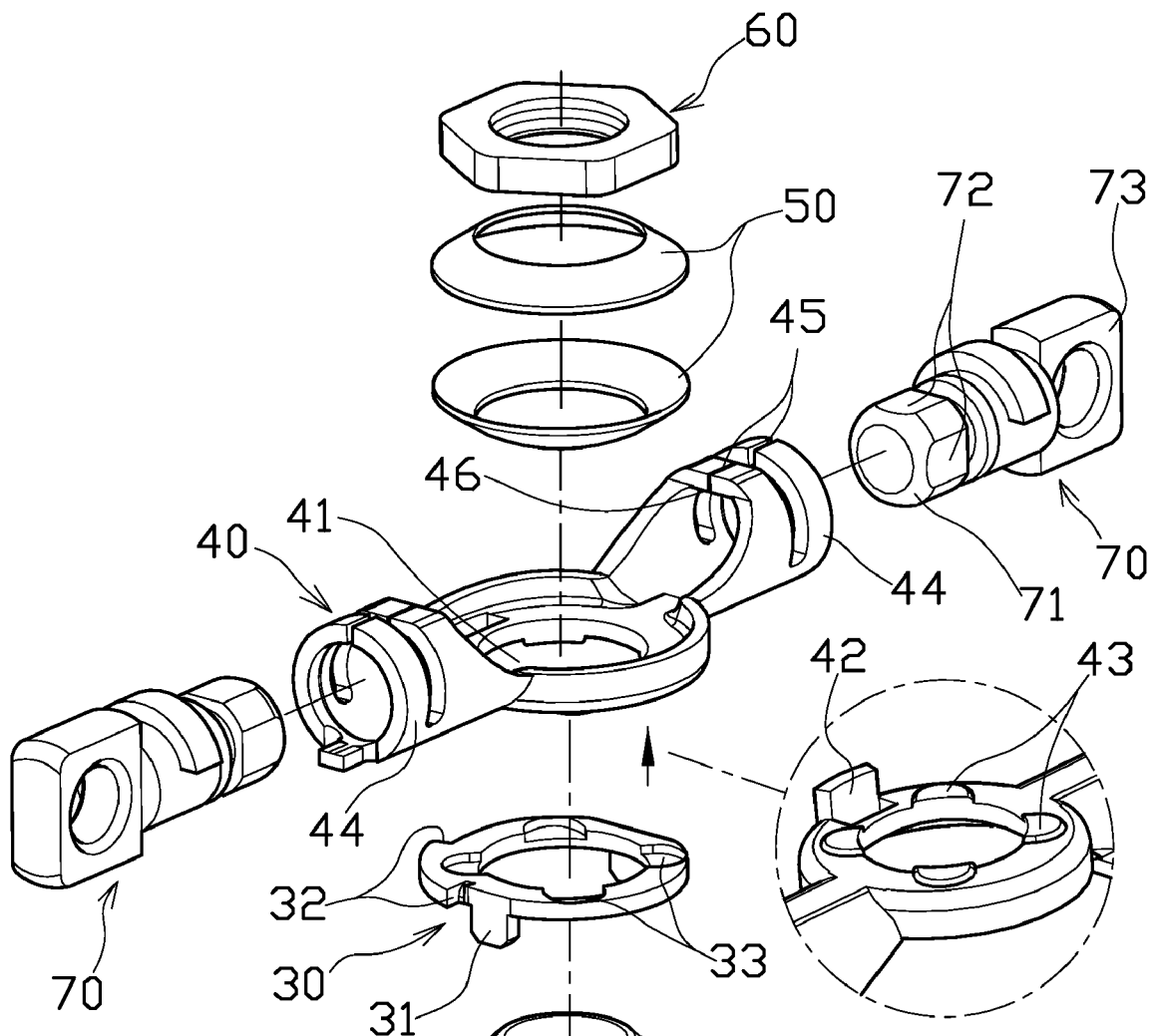
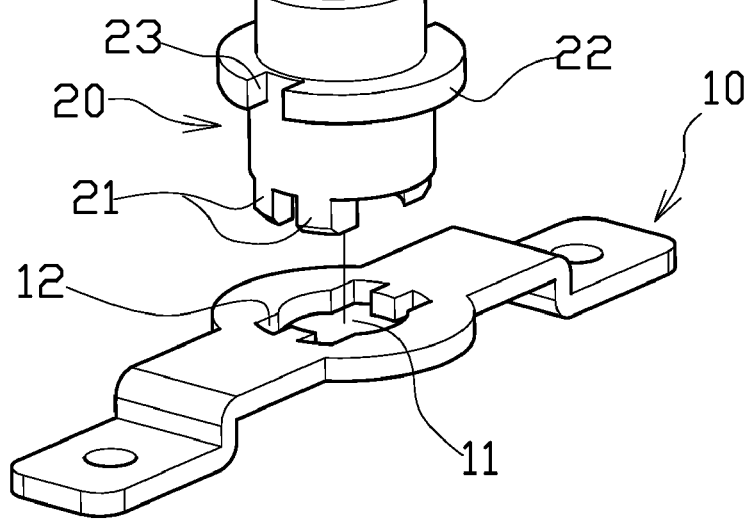

HINGE ROTATIVE ON TWO MUTUAL ORTHOGONAL AXES

BACKGROUND OF THE INVENTION

1. Field of the invention

The present invention relates to a hinge rotative on two mutual orthogonal axes, and especially to a hinge used in electronic equipment having a screen and a main body, for instance, in an area connecting with an openable and rotatable liquid crystal display screen on a camera, in a notebook or other similar electronic equipment.

2. Description of the Prior Art

In a U.S. Pat. No. 6,845,546 published on Jan. 25, 2005 and titled as "HINGE ASSEMBLY WITH A ROTATION SEAT AVAILABLE TO ROTATE IN BOTH LATITUDINAL AND LONGITUDINAL DIRECTIONS WITH RESPECT TO A FIXING SEAT", a hinge applicable to a DV camera or a notebook is provided, the hinge mainly is composed of a fixing seat and a rotation seat. The rotation seat is securely connected to a fixing plate of the fixing seat through its rotation shaft, thus the rotation seat itself can be rotated relative to the fixing plate for an angle about a vertical axis; the rotation seat is provided thereon with two horizontal connecting legs rotatable about a horizontal axis.

The upper end of the rotation shaft is extended through by a main body of the rotation seat, leaf springs and washers and is connected by riveting; wherein twisting forces provided by the leaf springs render the upper end of the rotation shaft unable to be adjusted after riveting, this results inferiority of manufacturing, and is not applicable to various electronic equipment.

Further in the above prior art, the connecting legs of the rotation shaft generally are used to control opening and closing of an LCD screen of the DV camera, they are set within the range of rotation of 0° to 90°; and in this prior art, only a shaft is extended into a resilient tube with a slit, no effect of positioning is provided, thus improvement is wanted.

And more, in this prior art, the rotation shaft and the fixing plate have only two connecting areas, when the stress in a set of foldable electronic equipment is larger some time, they are subjected to damaging.

SUMMARY OF THE INVENTION

The present invention provides an improvement on the conventional deficient hinge, firstly, two positioning planes for two resilient sleeves of the rotation seat are provided each at two sides of a slit on the upper surface of a corresponding resilient sleeve in order that two connecting legs can be more tightly engaged in the resilient sleeves; and when the connecting legs are rotated to their opening and closing positions of 0° and 90°, the holding forces for them are increased, and hence evidently better positioning effects can be obtained.

And more, the positioning structure of the connecting legs of the present invention can also be designed to have inwardly protruding strips in lieu of the positioning planes, and the opening and closing positions of 0° and 90° where the connecting legs are rotated to in the resilient sleeves are provided each with two recesses; the recesses are engaged with the protruding strips to achieve the positioning effect at the opening and closing positions.

Another improvement of the present invention is resided in that, after the upper end of the rotation shaft is extended through the rotation seat, spring washers and normal washers, its top is screw locked to an adjustable nut, by the adjustability of the nut, forces that the nut presses the spring washers are different, thereby magnitude of the twisting force on the rotation seat can be adjusted to suit various electronic equipment.

And more, a connecting area between the rotation shaft and a fixing plate of the present invention is given with four protrusions for riveting to get a stable structure.

The present invention will be apparent in its structure and the operation after reading the detailed description of the preferred embodiment thereof in reference to the accompanying drawings.

BRIEF DESCRIPTION OF THE DRAWINGS

FIG. 2 is an anatomic perspective view of the present invention;

FIG. 2A is an enlarged perspective view taken from a part of FIG. 2, which part is shown upside down for understanding;

DETAILED DESCRIPTION OF THE PREFERRED EMBODIMENT

Figure 1:
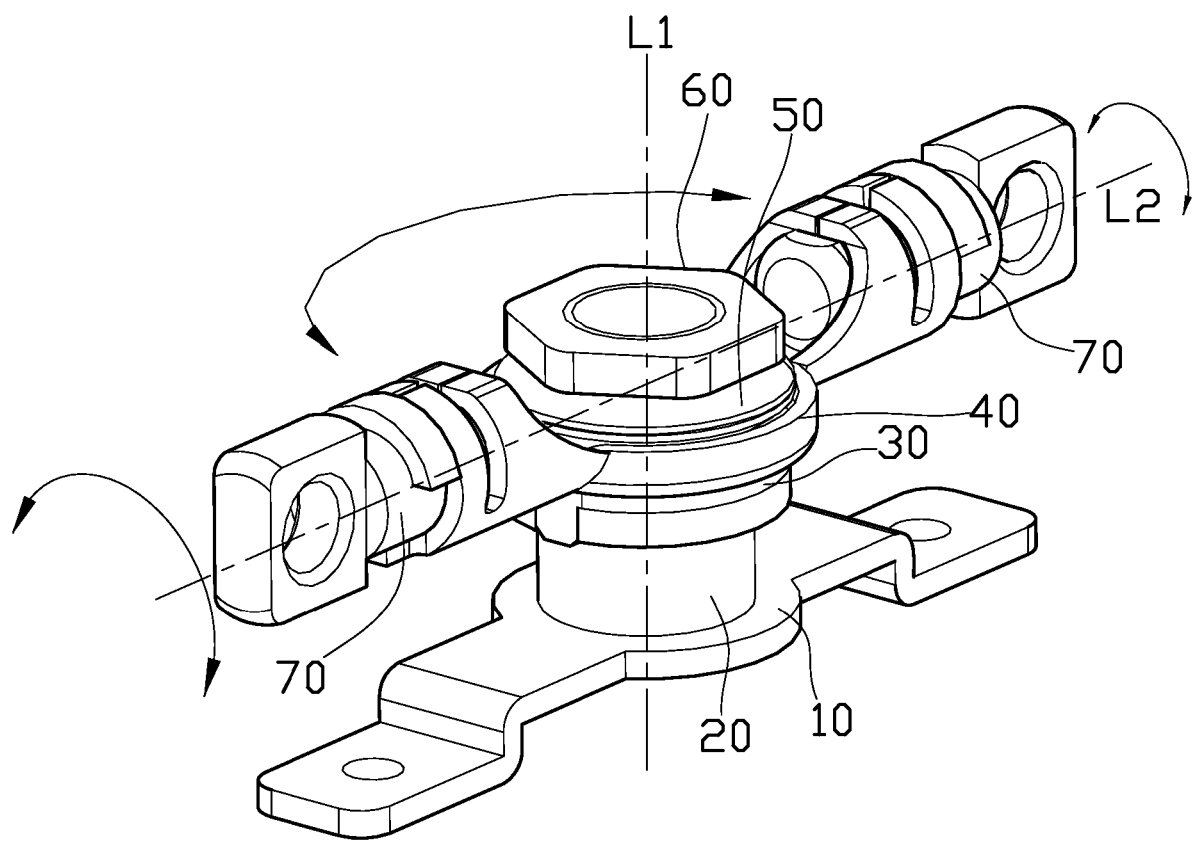
FIG. 1 is a perspective view of the present invention after assembling.
Figure 3:
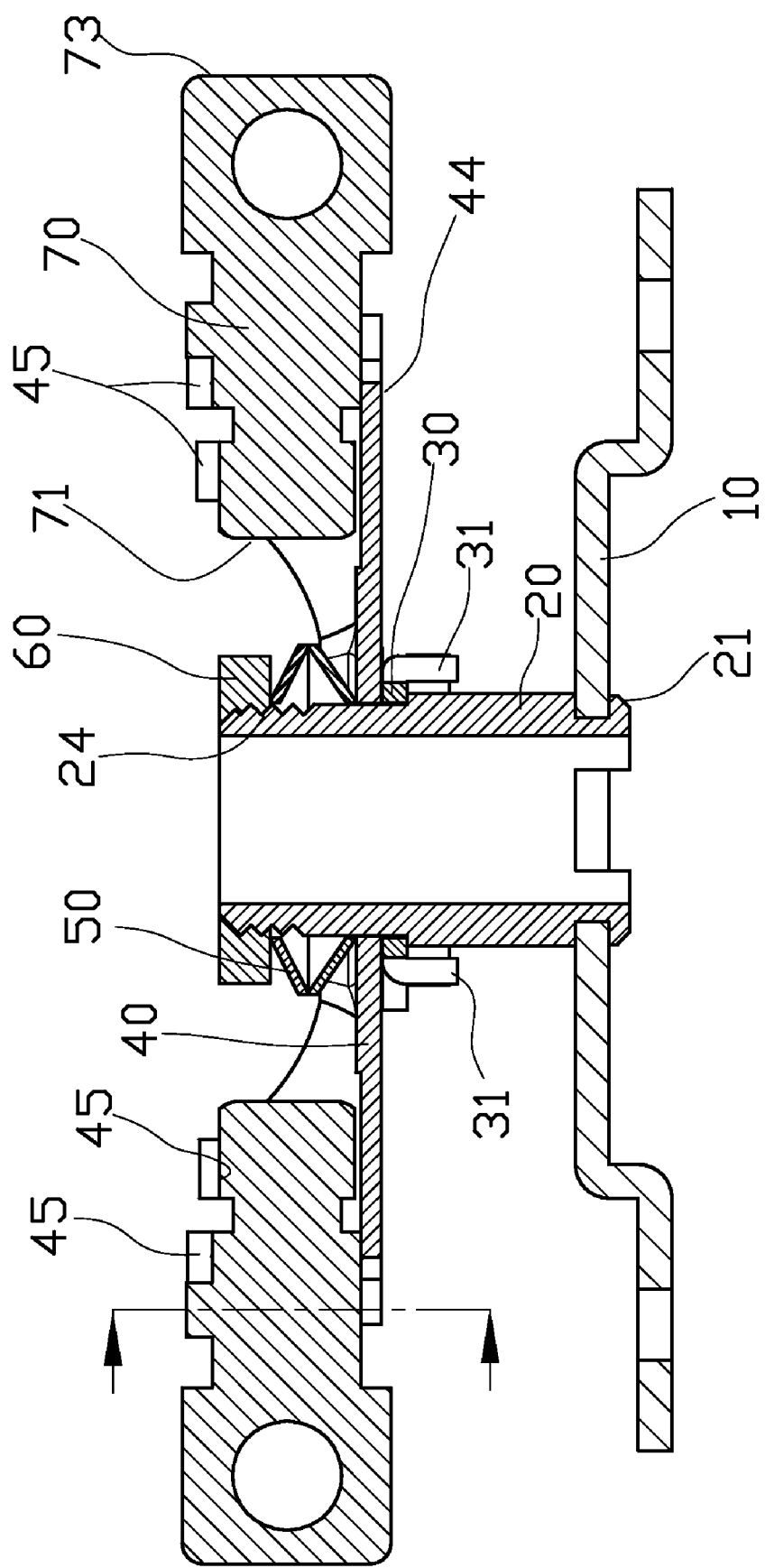
FIG. 3 is a sectional view taken from the present invention.

Referring to FIGS. 1 and 2, a hinge of the present invention mainly has a fixing plate 10 with a central hole 11 which is round generally, the periphery of the central hole 11 is cut to form four notches 12 for extending therethrough of four protrusions 21 on the bottom of a rotation shaft 20, the protrusions 21 are folded after extending therethrough as shown in FIG. 3, so that the rotation shaft 20 is assembled with and on the fixing plate 10.

The rotation shaft 20 has at its middle a flange 22 provided thereon with a pair of notches 23 to be extended therein of a pair of position limiting legs 31 protruding down from a position limiting sheet 30 for assembling; the flange 22 on the rotation shaft 20 is assembled thereabove with a round hole 41 of a rotation seat 40 and spring washers 50. The rotation shaft 20 has on its upper end a threaded portion 24 which is locked in a nut 60 to press the spring washers 50.

The position limiting sheet 30 is formed on its edge a stop section 32 to be contacted with a protrusion 42 extending downwards from the rotation seat 40 to limit the range of swiveling of the rotation seat 40 on the rotation shaft 20. The top of the position limiting sheet 30 is formed thereon a plurality of recesses 33 which are mated respectively with a plurality of protrusions 43 on the bottom of the rotation seat 40 to get a positioning effect when the rotation seat 40 is rotated.

The rotation seat 40 has two resilient sleeves 44 extending to the two mutually opposite sides, each resilient sleeve 44 is provided on its top with two slits 45, a plane 46 is provided to make one of the two slits 45 at its middle.

Connecting legs 70 have their shafts 71 closely fitted respectively in the two resilient sleeves 44; with the slits 45, the shafts 71 can be rotated for an angle in the resilient sleeves 44 and are fixed. Two surfaces 72 are spaced 90 degrees on each of the shafts 71, when either of the surfaces 72 is contacted with the plane 46 on one of the resilient sleeves 44, by virtue that the clamping force of the slits 45 is strong, an evident effect of positioning can thus be formed, e.g., opening and closing positions can be formed on an LCD screen plate on a DV camera. The connecting legs 70 each has on its outer end a connecting portion 73 for assembling with the screen plate, reference can be made to the prior art.

After assembling of the present invention, as is shown in FIG. 1, the rotation seat 40 can be rotated about a vertical axis L1 relatively to the fixing plate 10 (shown by an arrow G1 in FIG. 1), and the connecting legs 70 can be rotated about a horizontal axis L2 (shown by an arrow G2 in FIG. 1).

The main improvements of the present invention are resided in the following three points:

1) The shafts 71 of the connecting legs 70 are formed therein the surfaces 72 for positioning to cooperate with the planes 46 on the resilient sleeves 44 of the rotation seat 40, thereby the holding capability of the connecting legs 70 is increased, and hence evidently a better positioning effect can be obtained. And more, each of the planes 46 on the resilient sleeves 44 is provided to make one of the two slits 45 at its middle, the effect of locking and the resiliency for the connecting legs 70 are both good, and the effect of closely fitting is good too.
2) The spring washers 50 are pressed by the nuts 60, thereby the twisting force on the rotation seat can be adjusted to increase the superiority of production of the entire hinge, and the twisting force can be adjusted to any of desired magnitudes for various electronic equipment.
3) There is another important point of the present invention, i.e., the hole 11 of the fixing plate 10 is cut to form the four notches 12, this can increase the areas of force bearing of the four protrusions 21 on the bottom of a rotation shaft 20 to thereby prolong the life of the present invention.

Figure 4:
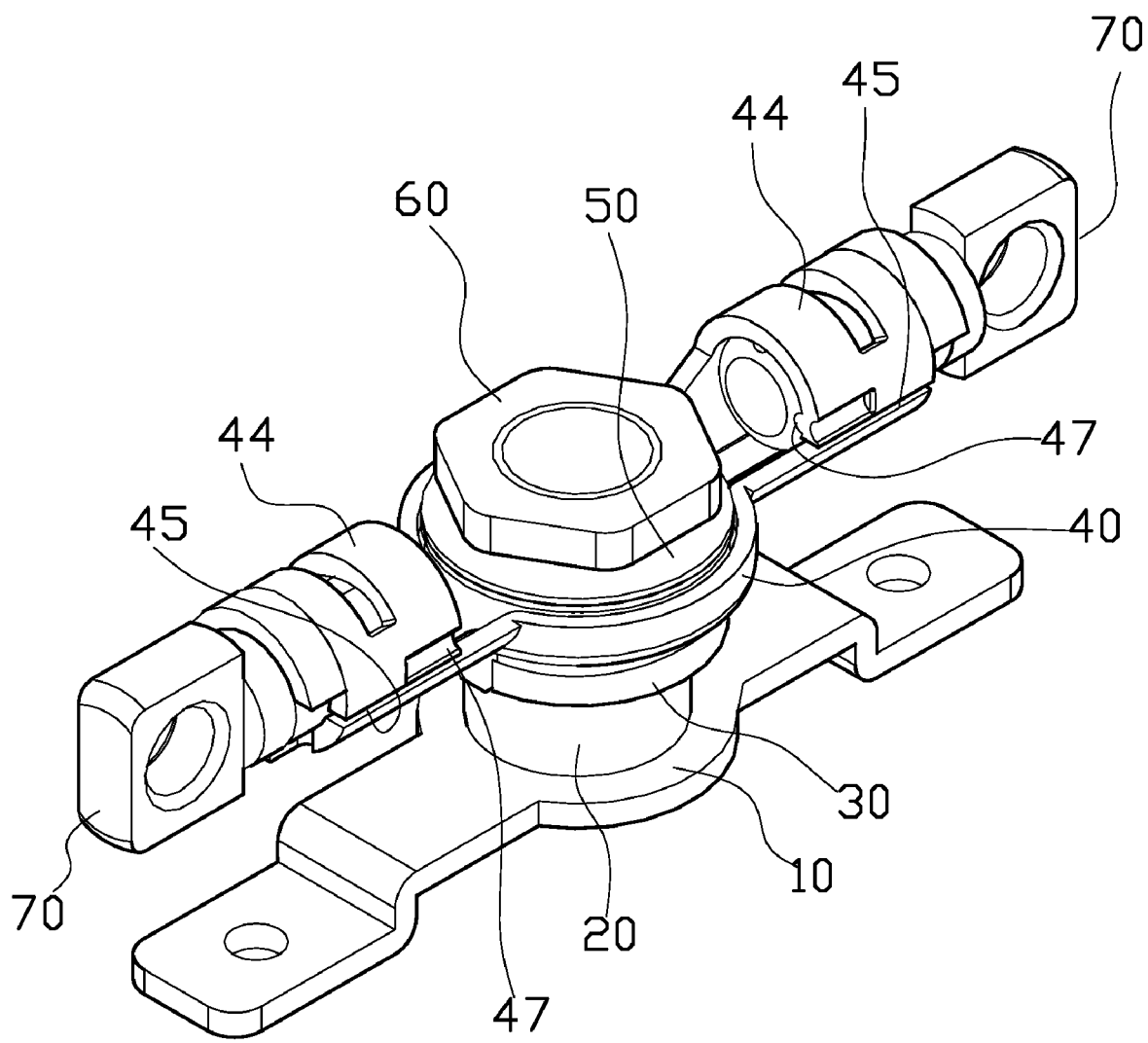
FIG. 4 is a perspective view of another embodiment of the present invention after assembling.
Figure 5:
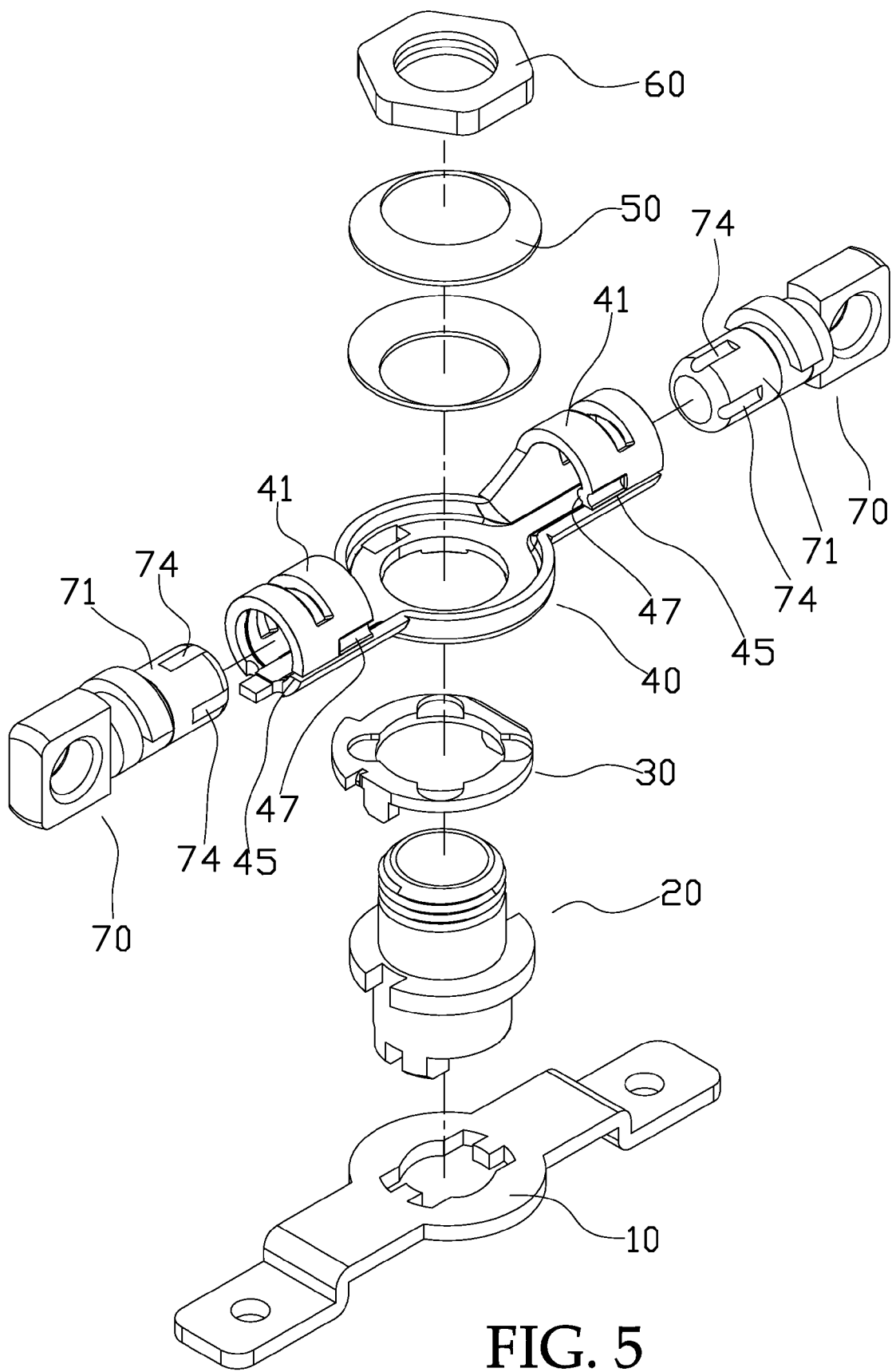
FIG. 5 is an anatomic perspective view of the embodiment of FIG. 4.
Figure 6:
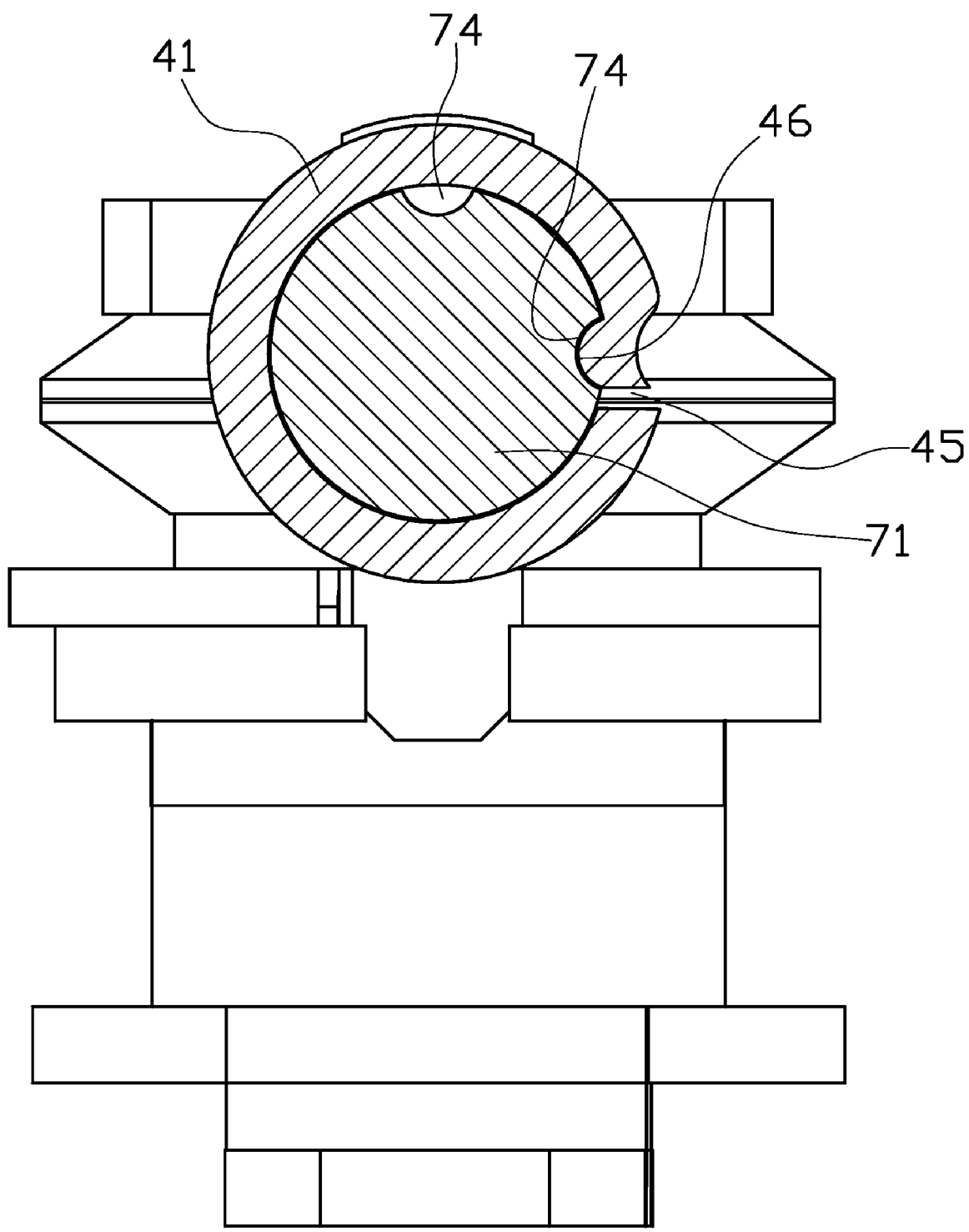
FIG. 6 is a sectional view taken from the embodiment of FIG. 4 showing the structure that a shaft of a connecting leg being assembled with a resilient sleeve.

Further, as shown in FIGS. 4 to 6, the resilient sleeves 44 provided on the two ends of the rotation seat 40 of the present invention each can be provided on its lateral side with a slit 45 extending in parallel with the axial direction, a strip 47 protruding inwards is provided above the slit 45. And more, the shaft 71 of the connecting legs 70 is provided with two recesses 74 angularly spaced for 90 degrees, by engaging of either of the recesses 74 with the strip 47 during each of the connecting legs 70 is rotated to an opening or a closing positions respectively at 0° and 90°, the recess 74 on its corresponding shaft 71 is engaged by the strip 47 to get a positioning effect. This design makes another embodiment of the present invention which renders the positioning effect better than the former embodiment having the design of the planes 46.

In conclusion, the present invention surely can get the improvement on the conventional hinge with substantial effect; therefore, what we claim as new and desire to be secured by Letters Patent of the United States is:

1. A hinge rotative on two mutual orthogonal axes comprising:
    a fixing plate for connecting with a main body of a set of electronic equipment;
    a rotation shaft assembled with and on said fixing plate, having on its upper end a threaded portion;
    a position limiting sheet assembled on said rotation shaft and having a stop section;
    a rotation seat extended therethrough by said rotation shaft, having a plurality of protrusions on a bottom of said rotation seat to contact with said stop section for limiting swiveling range of said rotation seat; said rotation seat having two resilient sleeves extending to two mutually opposite sides;
    spring washers provided on said rotation seat to press said rotation seat during rotating;
    a nut provided above said spring washers and connected with said threaded portion on said upper end of said rotation shaft;
    two connecting legs each having a connecting portion and a shaft, at least two planar surfaces being spaced 90 degrees on said shaft, said shaft rotatably connected to one of said resilient sleeves;
    said hinge is characterized in that: said resilient sleeves of said rotation seat each is provided on its top with two slits, a plane is provided on an interior of each of said resilient sleeves such that one of said two slits is disposed at the middle of said plane; when either of said surfaces spaced 90 degrees on said shaft is contacted with said plane on said resilient sleeve, holding force is increased, and hence evidently better positioning effect is obtained.

2. The hinge rotative on two mutual orthogonal axes as claimed in claim 1, wherein said threaded portion on said upper end of said rotation shaft is locked in said nut for adjusting twisting force on said rotation seat.

3. The hinge rotative on two mutual orthogonal axes as claimed in claim 1, wherein said fixing plate has a central hole which is generally round, a periphery of said central hole has four notches receiving four protrusions extending from the bottom of said rotation shaft.

4. The hinge rotative on two mutual orthogonal axes as claimed in claim 1, wherein a top of said position limiting sheet is formed thereon a plurality of recesses which are mated respectively with said plurality of protrusions on a bottom of said rotation seat to get a positioning effect when said rotation seat is rotated.

5. A hinge rotative on two mutual orthogonal axes comprising:
    a fixing plate for connecting with a main body of a set of electronic equipment;
    a rotation shaft assembled with and on said fixing plate, having on its upper end a threaded portion;
    a position limiting sheet assembled on said rotation shaft and having a stop section;
    a rotation seat extended therethrough by said rotation shaft, having a plurality of protrusions on a bottom of said rotation seat to contact with said stop section for limiting a swiveling range of said rotation seat; said rotation seat having two resilient sleeves extending to two mutually opposite sides;
    spring washers provided on said rotation seat to press said rotation seat during rotating;
    a nut provided above said spring washers and connected with said threaded portion on said upper end of said rotation shaft;
    two connecting legs each having a connecting portion and a shaft, at least two recesses being spaced 90 degrees on said shaft, said shaft rotatably connected to one of said resilient sleeves;
    said hinge is characterized in that: said resilient sleeves of said rotation seat each is provided on its lateral side with a slit, a strip protruding inwards is provided adjacent each of said slits, by engaging of either of said recesses with one of said strips, holding force is increased, and hence evidently better positioning effect is obtained.

6. The hinge rotative on two mutual orthogonal axes as claimed in claim 5, wherein said threaded portion on said upper end of said rotation shaft is locked in said nut for adjusting twisting force on said rotation seat.

7. The hinge rotative on two mutual orthogonal axes as claimed in claim 1, wherein said fixing plate has a central hole which is generally round, a periphery of said central hole has four notches receiving four protrusions extending from the bottom of said rotation shaft.

8. The hinge rotative on two mutual orthogonal axes as claimed in claim 5, wherein a top of said position limiting sheet is formed thereon a plurality of recesses which are mated respectively with said plurality of protrusions on a bottom of said rotation seat to get a positioning effect when said rotation seat is rotated.

* * * * *